(12) United States Patent
Hill et al.

(10) Patent No.: US 11,569,995 B2
(45) Date of Patent: Jan. 31, 2023

(54) PROVISIONAL AUTHENTICATION OF A NEW DEVICE ADDED TO AN EXISTING TRUST GROUP

(71) Applicant: Seagate Technology LLC, Fremont, CA (US)

(72) Inventors: Corey Hill, Broomfield, CO (US); Dieter Schnabel, Erie, CO (US)

(73) Assignee: Seagate Technology LLC, Fremont, CA (US)

( * ) Notice: Subject to any disclaimer, the term of this patent is extended or adjusted under 35 U.S.C. 154(b) by 143 days.

(21) Appl. No.: 17/249,809

(22) Filed: Mar. 15, 2021

(65) Prior Publication Data

US 2022/0294627 A1 Sep. 15, 2022

(51) Int. Cl.
*H04L 9/32* (2006.01)
*H04L 9/08* (2006.01)

(52) U.S. Cl.
CPC ............. *H04L 9/321* (2013.01); *H04L 9/083* (2013.01); *H04L 9/0877* (2013.01); *H04L 9/3234* (2013.01)

(58) Field of Classification Search
CPC ....... H04L 9/321; H04L 9/083; H04L 9/0877; H04L 9/3234; H04L 63/105; H04L 2209/127; H04W 12/66
See application file for complete search history.

(56) References Cited

U.S. PATENT DOCUMENTS

| | | | |
|---|---|---|---|
| 8,645,702 B2 | 2/2014 | Zhang | |
| 8,966,568 B2 | 2/2015 | Abendroth et al. | |
| 9,208,318 B2 | 12/2015 | Lee et al. | |
| 10,482,034 B2 | 11/2019 | Kou et al. | |
| 2003/0120948 A1* | 6/2003 | Schmidt | H04L 63/0815 726/8 |
| 2005/0033987 A1* | 2/2005 | Yan | G06F 21/57 726/4 |
| 2009/0013406 A1* | 1/2009 | Cabuk | G06F 21/57 726/22 |
| 2009/0276841 A1* | 11/2009 | Guo | H04L 63/0823 713/155 |
| 2010/0107244 A1* | 4/2010 | Li | G06F 21/577 726/22 |
| 2010/0250922 A1* | 9/2010 | Bao | H04L 63/0823 713/158 |
| 2013/0061056 A1* | 3/2013 | Proudler | G06F 21/57 713/176 |
| 2015/0222604 A1* | 8/2015 | Ylonen | H04L 9/3263 713/171 |
| 2018/0109378 A1* | 4/2018 | Fu | H04L 9/0897 |

\* cited by examiner

*Primary Examiner* — Techane Gergiso
(74) *Attorney, Agent, or Firm* — Kagan Binder, PLLC

(57) ABSTRACT

Apparatus and method for managing devices within a trust boundary of a computer network. In some embodiments, a trust manager circuit uses a first registration authority to authenticate a plurality of processing devices to form a trust group. A new processing device is subsequently added to the group. The trust manager circuit uses a different, second registration authority to provisionally authenticate the new processing device in response to an unavailability of the first registration authority, and grants provisional rights to the new processing device. Once the first registration authority is once again available, the trust manager performs a full authentication of the new processing device and grants full rights to the device.

20 Claims, 7 Drawing Sheets

CENTRALIZED TRUST AUTHENTICATION

PEER-LEVEL TRUST AUTHENTICATION

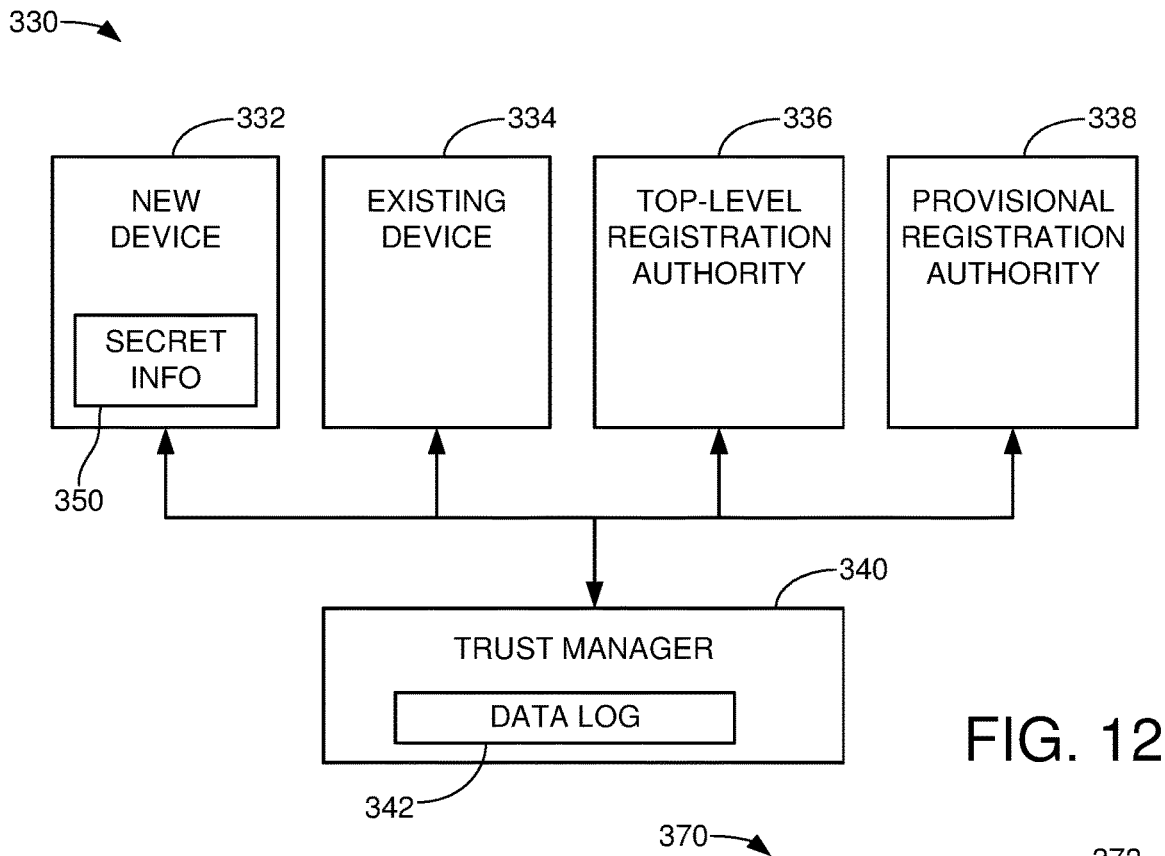
FIG. 12
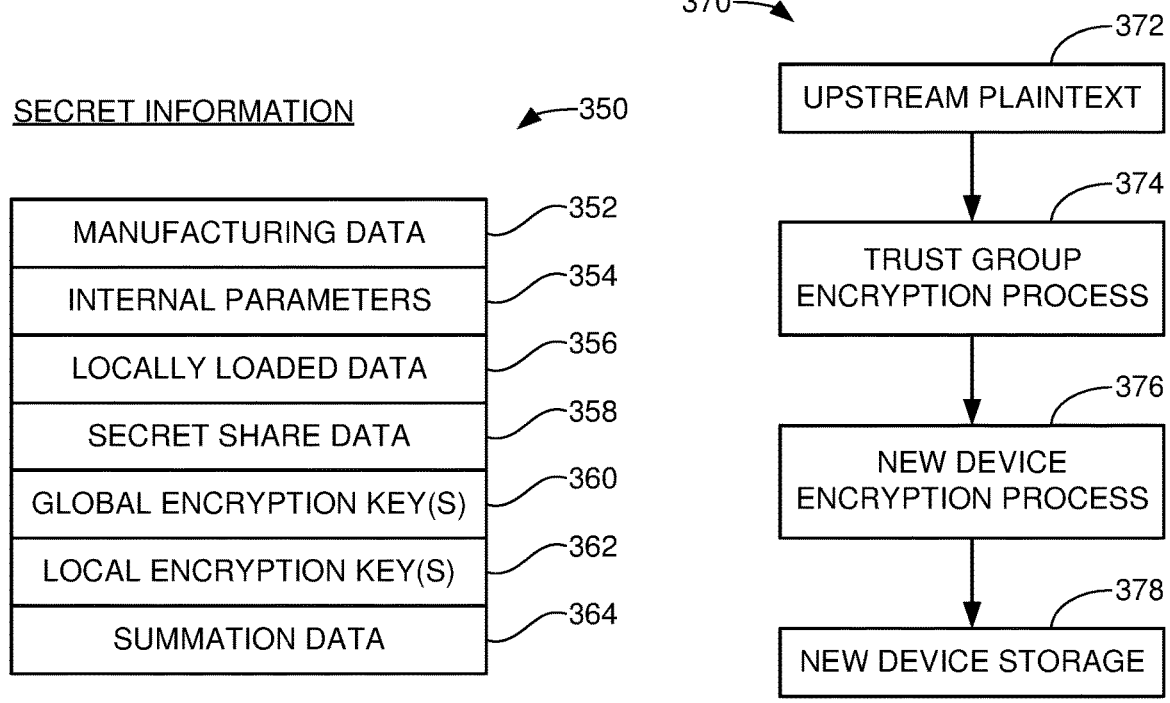
FIG. 13
FIG. 14

PROVISIONAL AUTHENTICATION OF A NEW DEVICE ADDED TO AN EXISTING TRUST GROUP

SUMMARY

Various embodiments of the present disclosure are generally directed to data security management in a computer network.

In some embodiments, a trust manager circuit uses a first registration authority to authenticate a plurality of processing devices to form a trust group. A new processing device is subsequently added to the group. The trust manager circuit uses a different, second registration authority to provisionally authenticate the new processing device in response to an unavailability of the first registration authority, and grants provisional rights to the new processing device. Once the first registration authority is once again available, the trust manager performs a full authentication of the new processing device and grants full rights to the device.

These and other features which characterize various embodiments of the present disclosure can be understood in view of the following detailed discussion and the accompanying drawings.

BRIEF DESCRIPTION OF THE DRAWINGS

FIG. 12 shows another trust management system in accordance with some embodiments.

FIG. 13 illustrates different types of secret information that can be used to provide provisional authentication of the new device in FIG. 12.

FIG. 14 is an operational sequence that can be used to protect data stored by the new device in FIG. 12.

DETAILED DESCRIPTION

Figure 1:
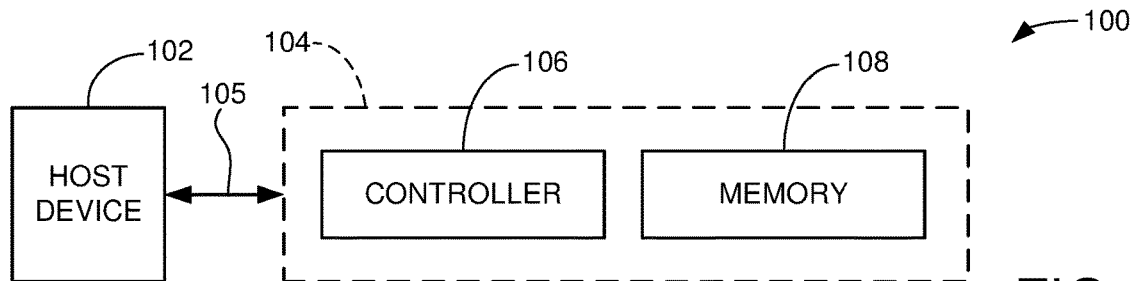
FIG. 1 is a functional block representation of a data processing system which operates in accordance with various embodiments of the present disclosure.

Various embodiments of the present disclosure are generally directed to managing groups of trusted devices in a computer network.

Data security schemes are used to protect data in a computer system against access and tampering by an unauthorized third party. Data security schemes can employ a variety of cryptographic security techniques, such as data encryption and other data security protocols.

Data encryption generally involves the transformation of an input data sequence into an encrypted output data sequence using a selected encryption algorithm. The input data can be referred to as plaintext, the output data can be referred to as ciphertext, and the selected encryption algorithm can be referred to as a cipher. The cipher may utilize one or more pieces of auxiliary data (keys) to effect the transformation. In this context, plaintext can include data that have been previously encrypted by an upstream encryption process, so encrypted ciphertext can be plaintext for a downstream encryption process.

Data security protocols generally deal with maintaining the security of data within a system, such as by establishing symmetric keys, carrying out secret sharing transactions, establishing and verifying connections, authenticating data, generating digital signatures and keyed message digests, establishing block chain ledgers, issuing challenge values for an authentication process, etc. In some cases, HMACs (hashed message authentication codes) can be generated and transmitted along with a data payload to help ensure that the received data payload from a secure source has not been altered or corrupted in transit.

These and other data security schemes are implemented around a concept often referred to as trust. Generally speaking, trust is a signifier that indicates the extent to which a particular data set can be either accepted for further processing, or rejected and discarded, based on the node(s) with which the data set is associated. The trust level is a measure of the trustworthiness, or confidence, that can be placed in the data. A trusted relationship exists between nodes if there is sufficient evidence that communications among the nodes are reliable and trustworthy. As in human relationships, nodal relationships can operate with various levels of trust, including absolute trust, high trust, medium trust, low trust and completely trust-free environments. Unfortunately, as is also often common with human relationships, nodal relationships can have nodes that exhibit trustworthy operation but can in time turn out to be untrustworthy (and vice versa).

A commonly employed trust management scheme assigns trust levels to individual nodes within the network, with the idea being that data passed through such nodes are imparted with corresponding levels of trust. There are a number of ways to establish trust among nodes. One commonly employed approach involves data exchanges that are carried out to verify authentic nodes, using a known trusted authority. This can include the transfer of challenge values, hashes, secret information, timing values, encrypted data, and other data forms that enable two communicating nodes to authenticate one another with an acceptable level of trust. In some cases, secret information, such as a private encryption key known only to trusted nodes, can be used as part of the verification process.

A group of authenticated nodes (devices) can be viewed as a trust group that exists within a trust boundary so that all of the devices within the designated trust boundary are confirmed as being sufficiently trustworthy. This boundary can be established using security protocols that establish that all of the known elements within this boundary are trustworthy. Nevertheless, even in a trusted environment, data transfers between nodes are often encoded by, or appended with, additional security information to further enhance and demonstrate trust levels within the system at the data set level. This provides an on-going assessment of trustworthiness of the system.

While operable, the continued reliance upon computer networks provides an ongoing need for advancements in evaluating and ensuring the trustworthiness of data communications among various nodes involved in data transfers, particularly in situations where new devices are added to an existing trust group. It is to these and other advancements that various embodiments are generally directed.

The present disclosure provides systems and methods for evaluating trust along a data path through a computer network. As explained below, some embodiments involve a mechanism that establishes a trust group as a set of trusted devices (nodes). These can be viewed as existing within a defined trust boundary.

Each of the devices of the trust group and which operate within the trust boundary are authenticated as being trustworthy using a first authentication authority (also sometimes referred to as a "registration authority"). The first registration authority can take any number of desired forms. In some cases, the first registration authority may be a trusted security interface (TSI) such as a remote security server that manages trust information for a population of devices. In other cases, the first registration authority may be a distributed, peer-to-peer authority that utilizes existing nodes and/or a trusted local hub to carry out the trust operation. It is contemplated that all of the devices within the trust group and residing within the trust boundary will have at least a minimum established level of trust.

The trusted devices within the trust boundary carry out a range of functions within the network. These functions can include, but are not limited to, the transfer of data among devices, or the transfer of data through such devices to other upstream and downstream devices within the network, including to other parts of the network having other trusted groups of devices.

At some point, it is contemplated that a new device is presented for addition to the trust group. Normally, the existing registration authority that was previously used to authenticate the existing devices in the trust group would be used to authenticate this new device as well, and thereby add the new device to the existing trust group.

However, under certain circumstances this registration authority may not be available at the time that the new device is presented for inclusion into the existing trust group. In such case, the new device is provisionally added as a member of the trust group using a different, second authentication (registration) authority. The second authority may be a local hub, another device within the trust group, another remote server, or some combination of these and other devices. It is contemplated that, in at least some cases, some measure of trust will be established for the new member, but this will be lower than that for the existing members of the trust group.

The provisionally added member is not granted full rights to the system, but is allowed to operate within the trust group in a limited way. The new member can thus contribute to processing operations carried out by the trust group, but additional steps or levels of verification are applied to contain the new member and prevent full operability.

At some point in the future, access is reestablished with the first trust authority, and this connection enables the provisionally added new member to be granted full access as a full member of the trust group. Verifications can be applied as necessary to validate actions taken by the new member to fully integrate the new member device into the group, including follow-up verification of data previously stored or otherwise processed by the new device prior to full authentication.

In this way, new devices can be added to an existing trust group within an existing trust boundary to support ongoing processing requirements without necessarily requiring the overhead processing requirements normally utilized to add the new devices to the group. The new device with provisional rights can have limited authority, but is not fully trusted until the device can be subsequently verified. Steps are taken to limit security incursions, corruptions or attacks that may be possible via granting limited membership to the trust group by the provisional member.

These and other features and advantages of various embodiments can be understood beginning with a review of FIG. 1 which shows a data processing system 100. The data processing system 100 includes a host (client) device 102 operably coupled to a data storage device 104 via a suitable interface 105.

The host device 102 and the data storage device 104 can each take a variety of forms. Without limitation, the host device 102 may take the form of a programmable processor, a personal computer, a workstation, a server, a laptop computer, a portable handheld device, a smart phone, a tablet, a gaming console, a RAID controller, a storage controller, a scheduler, a data center controller, etc.

The data storage device 104 may be a hard disc drive (HDD), a solid-state drive (SSD), a thumb drive, an optical drive, a tape drive, an integrated memory module, a multi-device storage array, a network attached storage (NAS) system, a data center, etc. The interface 105 can be a local wired or wireless connection, a network, a distributed communication system (e.g., the Internet), a network that involves a satellite constellation, etc. The interface 105 can also be various combinations of these and other forms of interconnections.

The data storage device 104 may be incorporated into the client device 102 or may be arranged as an external component. For purposes of the present discussion, it will be contemplated that the host device 102 is a computer and the data storage device 104 provides a main memory store for user data generated by the host device. While not limiting, the memory 108 may include non-volatile memory (NVM) to provide persistent storage of data. As will be recognized by the skilled artisan, an NVM maintains data stored thereto even in the absence of applied power to the NVM for an extended period of time.

Figure 2:
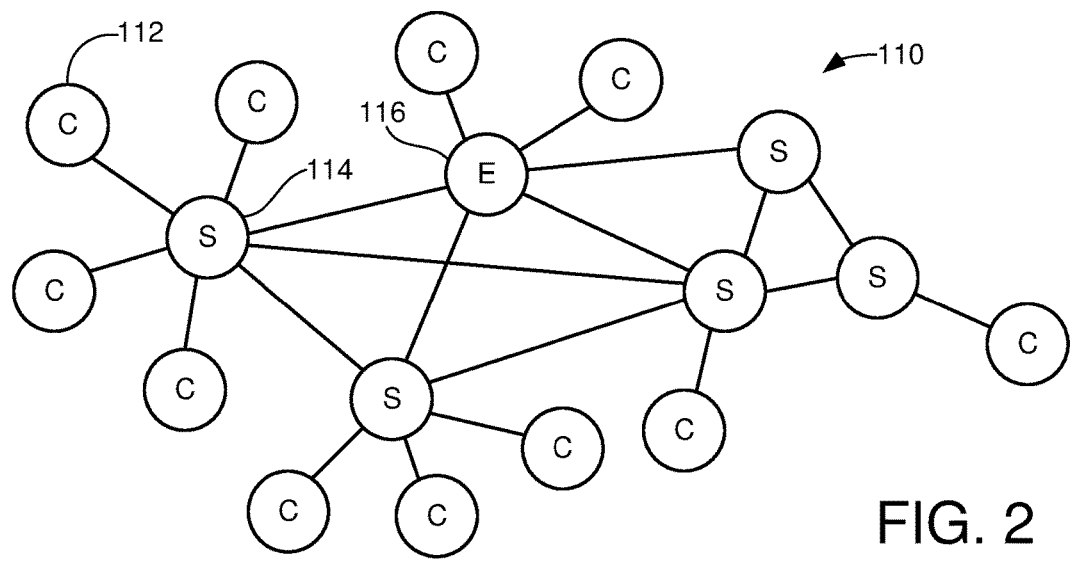
FIG. 2 shows a computer network that can incorporate host devices and storage devices as depicted in FIG. 1.

FIG. 2 shows a computer network 110 in a distributed data storage environment. The network 110 has a number of interconnected processing nodes including client (C) nodes 112 and server (S) nodes 114. The client nodes 112 may represent local user systems with host computers 102 and one or more storage devices 104 as depicted in FIG. 1. The server nodes 114 may interconnect groups of remotely connected clients and may include various processing and storage resources (e.g., servers, storage arrays, etc.) and likewise incorporate mechanisms such as the host device 102 and storage device 104 in FIG. 1. Other arrangements can be used. It will be understood that the monitoring processing described herein can be used to track the operation of the server nodes 114 responsive to requests issued by the client nodes 112.

Generally, any node in the system can communicate directly or indirectly with any other node. The network 110 can be a private network, a public network, a high performance computing (HPC) network, a cloud computing environment, a software container system, the Internet, a local area network (LAN), a wide area network (WAN), a satellite constellation, an Internet of Things (IoT) arrangement, a microcontroller environment, or any combination of these or other network configurations. Local collections of devices can be coupled to edge computing devices that provide edge of Internet processing for larger processing-based networks. One such edge (E) device is denoted at 116.

Figure 3:
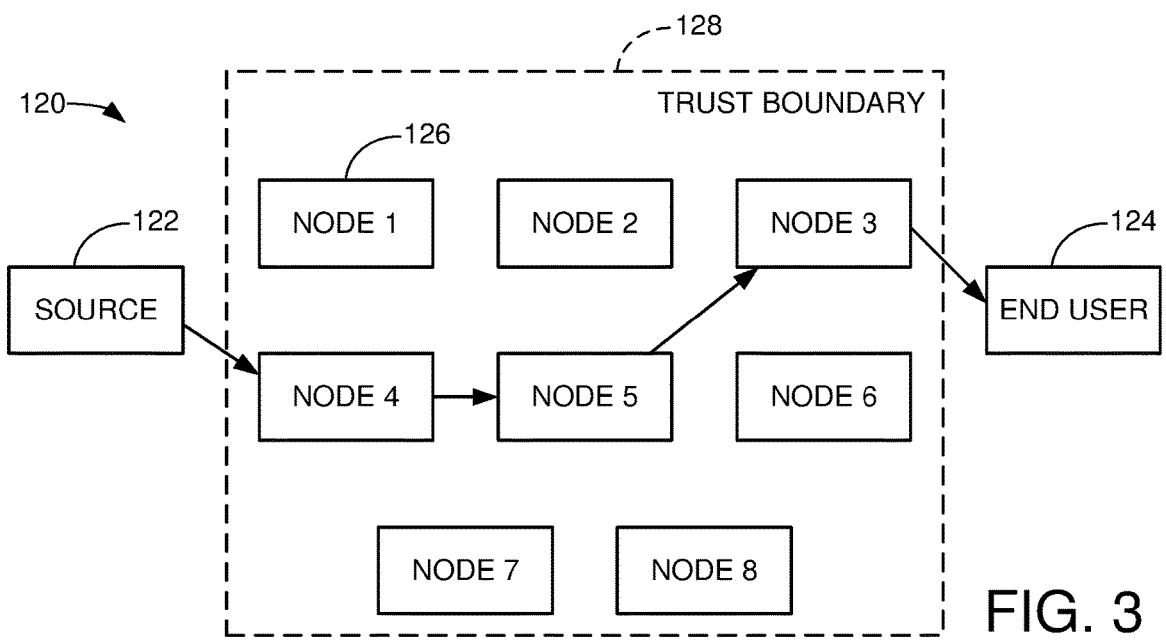
FIG. 3 illustrates various nodes of a trusted group of devices (nodes) within a trust boundary of the network of FIG. 2.

FIG. 3 shows a data processing system 120 that may form a portion of a computer network such as represented at 110 in FIG. 2. Generally, the system 120 in FIG. 3 operates to transfer data from a source node 122 (hereinafter "source") to a destination node 124 (hereinafter "end user node" or "end user") through one or more intermediate nodes 126. The intermediate nodes 126 are denoted as Nodes 1-8 and are disposed within a trust boundary 128. For reference, a trust boundary such as 128 is a physical and/or logical area (set) in which at least a minimum level of trust is established for all elements within the area/set.

The form and type of data transfer between the source 122 and the end user 124 is not germane to the present discussion, as substantially any sort of network communication can be used to transmit at least one bit from the source to the end user. As such, the data transfer may be the issuance of a simple command, the transfer of data from the source 122 to the end user 124 for storage at the end user node, a request to retrieve data stored at the end user, the initiation of the execution of a selected application, the launching and execution of a software container, a query of a data base, a status query, a trim command, a block chain mining operation, and so on.

In some cases, requests issued by the source 122 result in a return path response that is subsequently forwarded from the end user 124 back to the source to complete the transaction. These requests and responses may take different paths through the network and can be viewed as separate, albeit related, transactions. For example, a first transaction may involve an initiator node (such as the source 122) directing a request to a target node (such as the end user 124), and a second transaction may subsequently involve the target node passing data back to the initiator node in response to the request. In this type of exchange, the initiator node may be the "source" node for the first transaction and the target node may be the "source node" for the second, follow-up transaction. The respective data paths taken between these nodes may be analyzed and processed separately or together in accordance with various embodiments.

In order to transfer these and other forms of data, one or more paths through the system 120 may be used. As used herein, a "path" is an indication of all sequentially arranged nodes that were involved in the associated data transfer. The path can include the source node and the destination node.

A total of eight (8) intermediate nodes 126 are depicted as existing within the trust boundary 128 of FIG. 3, although it will be understood that any number of available nodes may be present in a given system. Each of the intermediate nodes 126 may be configured with routing, controller, monitoring and local data storage functions to enable data, usually in the form of packets, to be received, evaluated and forwarded in order to direct the packets to the destination node 124.

To this end, each node 126 may have a configuration as generally depicted in FIG. 1, including a local host device 102 and a local storage device 104, although such is not necessarily required. The particular path shown in FIG. 3 passes from the source 122 to successive Nodes 4, 5, 3, and from there to the end user node 124. Any number of other alternative paths from the source to the end user could be taken as required.

Each of the intermediate nodes 126 in FIG. 3 is contemplated as constituting a "trusted node." Specifics regarding trust levels will be provided in greater detail below, but at this point it will be understood that the various nodes have been evaluated in such a manner that each has an associated trust level (TL) that is a general indication of the reliability, or trustworthiness, of each of the nodes. Because the nodes are trusted, the data passed by each node are viewed as being trustworthy as well. Each node has a sufficiently high TL so that data can be safely transferred from the source to the end user to meet some predetermined security criteria associated with the trust boundary 128.

In some cases, the trust boundary 128 can be extended to include the source 122 and the end user 124, as well as other nodes (not shown). Trust can be measured and expressed in a number of ways, such as on a sliding scale. In the present example, the Nodes 1-8 may all have the same TL, or may have different TLs such that some of these respective nodes have a relatively higher level of trustworthiness and others of these nodes have a relatively lower level of trustworthiness. In one example, TL values are presented on a calculated scale such as from 0 (no trust) to 100 (full trust). Some minimum level, such as TL>50, may be used in order to allow entrance into the trust boundary. Other levels can be used.

Depending on the configuration of the system, a large block of data to be transferred from the source 122 to the end user 124 may be broken up into smaller packets of fixed size, and these respective packets may be transferred via different paths through the nodes 126. Indeed, this is one of the advantages of distributed data communication networks (e.g., the Internet, etc.), since redundancies and other mechanisms can be incorporated in the data transfer arrangement to ensure reliable receipt of the data by the end user node 124 from the source 122 through different intermediary nodes 126. Each of the nodes 126 along the transfer path may verify data packets received by upstream nodes and may further append security data to the packets before passing the packets downstream towards the end user destination.

Figure 4:
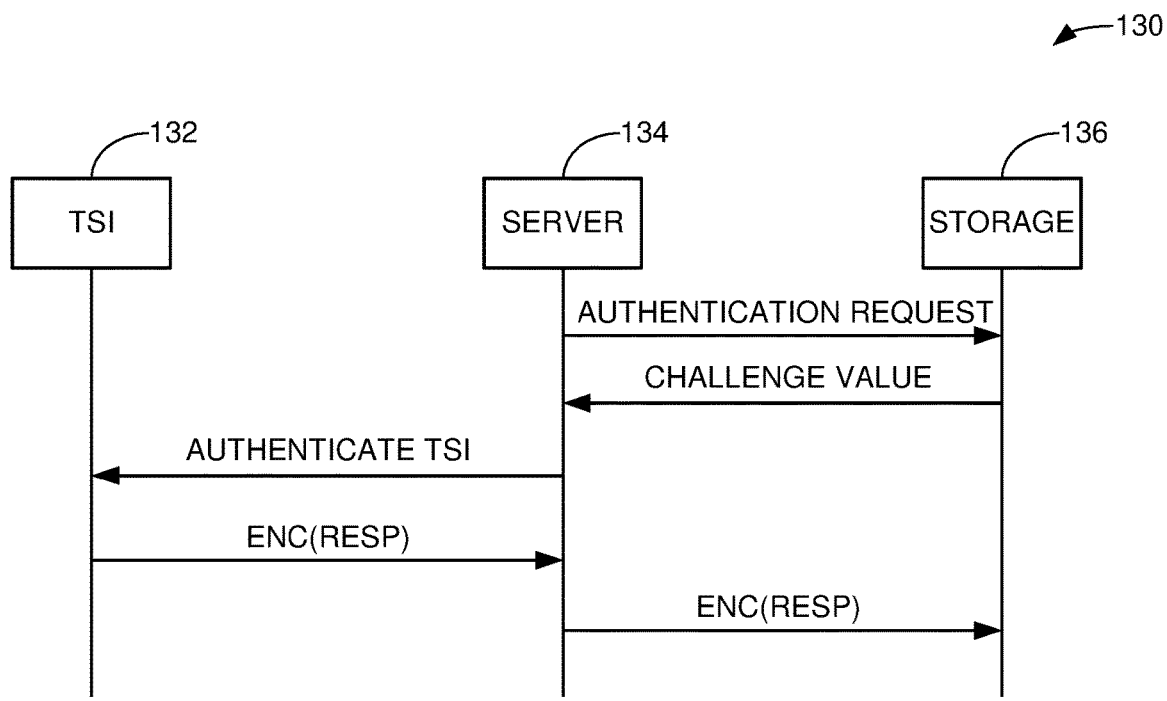
FIG. 4 is a timing sequence to illustrate a centralized authentication operation that can be utilized to establish the trust boundary of FIG. 3.

FIG. 4 provides a diagram for a centralized trust authentication system 130 in accordance with some embodiments. The system 130 can be used to establish the trust boundary 128 in FIG. 3 for the respective nodes 126 contained therein.

FIG. 4 includes a TSI (trusted security interface) node 132, a server node 134 and a storage node (device) 136. The TSI may be a remote server or other node within the system having security information and controls sufficient to establish trust for other elements of the system. The server node 134 may be a host computer such as denoted at 102 in FIG. 1, and the storage node 136 may be a storage device, or a grouping of storage devices, such as denoted at 104 in FIG. 1. In some cases, the TSI node 132 may be associated with a manufacturer of certain elements within the network, such as the storage devices utilized at the storage nodes 136. As used herein, the TSI 132 may sometimes be referred to as a first authentication authority or a first registration authority.

Any number and types of respective devices can be involved in a centralized authorization sequence as depicted in FIG. 4, so the example is merely for purposes of illustration and is not limiting. Overall, the idea is that individual authentication exchanges take place among one (or more) serially connected devices and a centralized, trusted authority in order to establish trust among these respective devices.

The sequence in FIG. 4 can begin with the issuance of an authentication request from the server 134 to the storage node 136. This can take a number of forms and may be initiated in response to a previous signal (not shown) issued to the server. In response, the flow of FIG. 4 provides the generation and issuance of a challenge value back from the storage node 136 to the server 134. This may be a random sequence or some other value.

In response, the server 134 may provide encryption or other cryptographic processing to issue an authenticate TSI value to the TSI node 132. This authentication value may include some encoded form of the challenge value from the storage node 136. In response, an encrypted response, denoted as ENC(RESP), is forwarded back to the server 134. This response is processed as required by the server, and forwarded to the storage node 136.

This simple example illustrates how that individual devices can authenticate one another as part of a verification process. Other sequences can be used. The various authentication data exchanges can be attended by encryption operations using secret encryption keys, hash values, hash message authentication code (HMAC) values, private-public key encryption techniques, secret sharing techniques, etc. in order to ensure that the various devices are authenticated. In one example, the storage device might perform a hash function operation upon certain data or encrypt certain data using a secret key. If the responses received back from the other devices show evidence that these devices have access to the same secret key, provide responses that generate the same hash values, etc., a level of trust can be generated among these devices.

Centralized authentication mechanisms such as depicted in FIG. 4 can be carried out continuously on a periodic basis to ensure that the respective devices with which a selected device communicates with are, in fact, authorized devices. As a result of the sequence shown in FIG. 4, it will be appreciated that successful authentication results in the server 134 having a high confidence in the trust levels for both the TSI 132 and the storage node 136. Similarly, the storage node 136 has a high confidence in the trust levels for both the TSI 132 and the server node 134, and the TSI 132 can trust both the server 134 and the storage nodes 134, 136. As noted above, this type of centralized authentication can involve any number and levels of devices. Referring again to FIG. 3, using the sequence of FIG. 4 in turn for each of the intermediate devices 126 can enable each of the Nodes 1-8 to be separately verified using the TSI node 132, thus ensuring that each of these intermediate nodes can trust one another.

Figure 5:
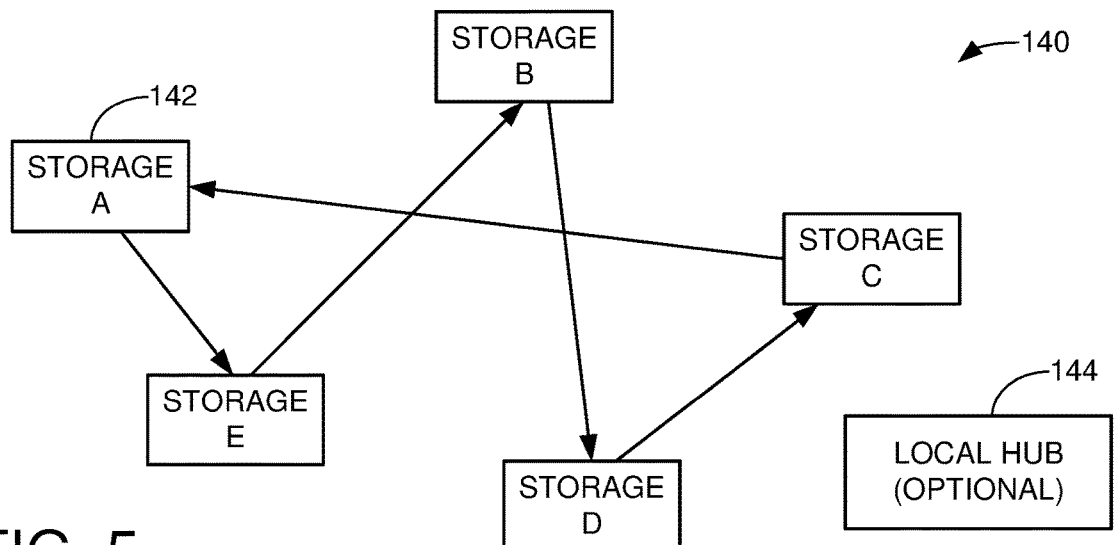
FIG. 5 is a timing sequence to illustrate a decentralized, peer-to-peer authentication operation that can be utilized to establish the trust boundary of FIG. 3.

FIG. 5 shows a functional block diagram for a decentralized, or peer-level, authentication system 140 in accordance with further embodiments. As before, the system 140 in FIG. 5 can be used to provide authentication of various individual nodes, and/or devices within a particular node, to ensure a specified trust level, such as the various nodes 126 provided within trust boundary 128 of FIG. 3.

Unlike the centralized approach in FIG. 4, the decentralized approach 140 in FIG. 5 relies on individual storage nodes 142 (or other types of nodes) communicating among one another to establish trust. Five (5) storage nodes 142 are identified in FIG. 5, noted as Storage A-E. In this particular arrangement, Storage Node (SN) C provides information to SN A in order to verify the veracity of SN C. SN A in turn provides information to SN E, SN E provides information to SN B, SN B provides information to SN D, and so on back to SN C. The information supplied may include secret information maintained by other nodes, which are verified in each subsequent transfer.

A local hub 144 can be optionally provided for use as part of the peer-level, trust authentication process. The local hub 144 can be a local server device or can be configured as one of the existing storage node devices, as desired. Transfers among peers can be mediated by the local hub as part of the peer-to-peer authentication process. In some cases, secret authentication information can be maintained by the local hub 144 alone or in combination with secret information maintained by the respective storage node devices 142. It will be appreciated that in this arrangement, the respective nodes 142, alone or in combination with the optional local hub 144, can be characterized as the first authentication (registration) authority.

A number of peer-level authentication mechanisms have been proposed in the art, including hub-based approaches, round-robin approaches, randomly selected approaches, multiple path verifications, etc. Regardless, the end result is essentially the same as depicted in FIG. 4; by the generation, transmission, receipt and evaluation of data received by other node(s), each node can both be authenticated as well as have a level of confidence (trust) in other nodes with which the node is in communication. These operations can be carried out repeatedly as required to maintain adequate levels of trust within the trust boundary.

Figure 6:
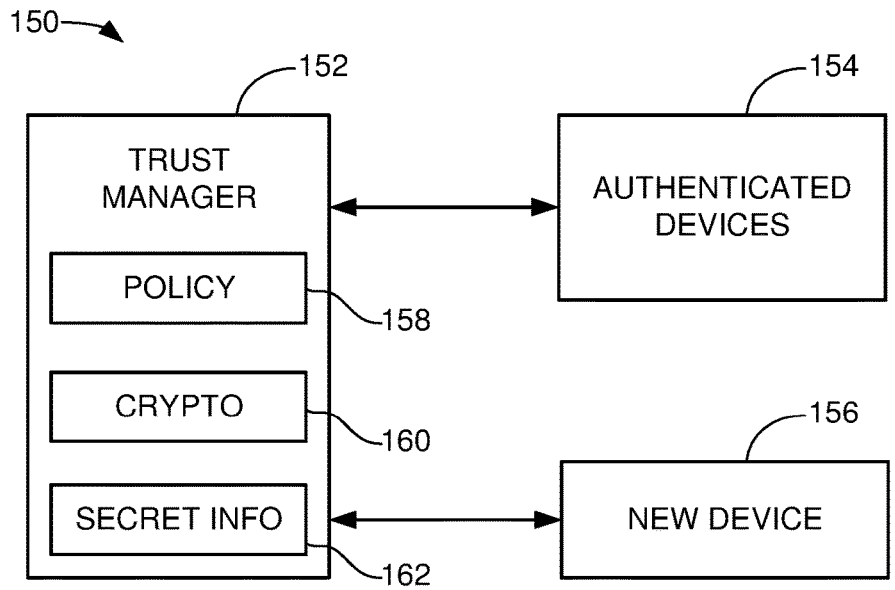
FIG. 6 shows a trust management system that operates to establish, monitor and enhance trust within a trust boundary such as that shown in FIG. 3 in accordance with various embodiments.

FIG. 6 shows a trust management system 150 constructed and operated in accordance with some embodiments. The trust management system 150 may be operated as described above to establish a trust boundary (such as 128) for a number of trusted nodes (such as 126) using centralized, peer-to-peer, and/or other trust mechanisms.

The trust management system 150 includes a trust manager 152. As explained below, the trust manager 152 is a circuit that operates to manage the devices within a local trust group, including the initial authentication of the trusted devices and the provisional authentication of new members that are subsequently added to the trust group.

The trust manager 152 can be implemented as an operational circuit using hardware and/or programming software/firmware. More specifically, in some embodiments the trust manager 152 may be configured as a software layer in a file management system of a particular network. In this case, one or more programmable processors may be supplied with associated programming instructions stored in a local memory and which are executed as required to carry out the functions of the trust manager in a background mode. This can include a dedicated server or distributed among one or more local servers/nodes within a given network. In other embodiments, the trust manager 152 may be arranged as hardware such as gate logic, an ASIC (application specific integrated circuit), a field programmable gate array (FPGA), a system on chip (SOC) device, and so on.

Regardless of form, the trust manager 152 operates as described above to generate a trust boundary that incorporates a number of trusted devices, generally denoted at 154. The trust manager 152 operates to initially authenticate these devices, and further operates to manage the operation of these trusted devices 154 during normal network transfer events, including period evaluations (as required) to maintain an up-to-date status of these devices as trusted devices within the associated trust boundary. In some cases, the trust manager 154 may calculate and manage specific trust levels (TL values) for the respective nodes, and perform different operations based on various trust or quality of service (QoS) specifications.

At some point, a new device 156 may be presented for inclusion within the existing trust group 154. The new device 156 can be presented in a number of ways, such as via an operation by system personnel to physically and/or logically interconnect the new device 156 (such as a spare device, additional capabilities for the existing system, etc.). In other cases, the new device 156 may be a portion of an existing network that requests addition/access to an existing portion of the network for new functions, capabilities, storage capacity, etc.

In still other cases, the trust manager 152 may perform an affirmative outreach to other available aspects of the network (including the new device 156) in order to carry out requests applied to the existing group on the basis that the existing resources of the existing trust group are insufficient to meet current needs. In yet other cases, the new device 156 may have formerly been a portion of another trust group, and this device is now being transferred to a different trust group. Other mechanisms can be utilized to present the new device to the existing trust group as well.

Regardless of the reason, it will be appreciated by the skilled artisan that the addition of new, entrusted devices to an existing trust group is a common occurrence in modern network operations, and there are any number of circumstances and bases for the presentation of a new device such as 156 to an existing trust group, even if the trustworthiness of the new device cannot, at the present time, be fully authenticated.

Under normal circumstances, the addition of the new device 156 by the trust manager 152 can be a relatively straightforward operation, provided that the resources used to authenticate each of the authenticated devices 154 in the existing trust group are available to authenticate the newly presented device 156. For example, if a centralized trust management system is used as in FIG. 4, similar challenge values and other transfers can be carried out with the remote TSI authority 132 to authenticate the new device. Similarly, if a peer-level trust authority is used, similar steps as carried out in FIG. 5 can be used to authenticate the new device 156.

However, it is contemplated that in some circumstances, the existing registration authority will not be available at the time that the new device 156 is presented for addition to the existing trust group. That is, there may be circumstances that arise wherein the TSI authority 132 is off-line or otherwise not available at present in order to carry out the necessary trust authentication. Similarly, there may be situations where local resources (either from the local hub or the individual devices) are not sufficient to enable a peer-level full authentication. For whatever reason, the unavailability of the first level registration authority prevents the new device from being able to be fully authenticated at the time the new device is presented for addition to the trust group.

The trust manager 152 accordingly operates to provide smart proxy device authentication of a newly added device. The level of authentication may not be as high as can be achieved by the remote server (or other authentication mechanism), but it can provide sufficient provisional authentication to enable the device to join and safely interact within the existing trust boundary.

A second level authentication (registration) authority is provided by the trust manager 152 with sufficient capabilities to perform local (proxy) authentication. The local registration authority may be a local host device, an alternative server node, or may be one or more of the other storage devices in the trust group. This second level authentication supplied to the new device 156 is sometimes referred to as provisional authentication.

The provisional authentication of the new device 156 can involve one or more data exchanges between the new device and the local (second level) registration authority. It is not likely that the local registration authority will have specific, unique information about the new device, but it may have information that is otherwise maintained secret that is common to other devices.

There are numerous ways in which this provisional authentication can be carried out. For example, a secret key, hash or other value can be incorporated into each of a class of nominally identical devices from a given manufacturer, so that the presence of this value can be used to provide the lower level authentication. In another example, a secret scheme can be used whereby unique values are stored to devices, and the unique values follow some secret rule such as adding up to a particular sum. If this sum is confirmed, trust can be established to admit the new device.

Regardless of the manner in which the new device is locally authenticated, limited access will be granted until such time that the new device can be subsequently verified using the normal authentication authority. A log can be maintained of actions taken by or with the probationary device to ensure that no secret attacks are carried out.

Further steps can be taken as well; for example, a new device added to a trust group may not have currently stored data, but rather is offered up as a new repository for newly stored data. In such case, additional precautions may be carried out. Data transfers to the new device may be managed by the local group such that data are encrypted using local encryption techniques of the new device, and the presented data may be subjected to an additional layer of encryption by the local authority (or other element in the trust group) prior to being forwarded to the new device. Other features that would normally be available to a fully trusted device may be restricted as well; for example, certain status command sets may be rendered inoperable to prevent leakage of important information to an attacking party attempting to use the new device as an attack point.

Data exchanges and operations may be noted to an end user that involve the new device. In this way, the user can have knowledge that one of the devices in the system is not fully trusted, and additional care can be taken as required to compensate for this diminished level of trust for the new device. Once the remote server comes back online and the new device is fully authenticated, the precautionary restrictions implemented during the probationary period will be lifted.

To this end, the trust manager 152 in FIG. 6 is shown to include various sub-modules, including a policy engine 158, a cryptographic function (crypto) circuit 160 and a secret information (info) repository 162. The policy engine 158 may incorporate various data security scheme specifications that should be followed during the operation of the trust manager 152, including those schemes required to provisionally admit a new device. The crypto circuit 160 can be configured to carry out various cryptographic operations described below as part of the implementation of the trust policies set forth by block 158. The secret information 162 can be one or more sets of secret information used to provide provisional trust for newly admitted devices.

Figure 7:
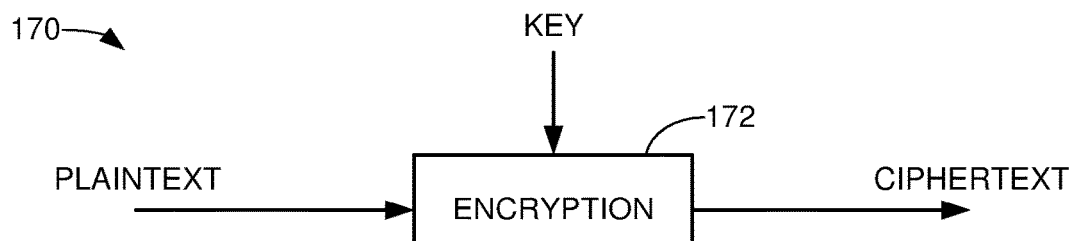
FIG. 7 illustrates an encryption block that may be utilized by the trust manager of FIG. 6.
Figure 8:
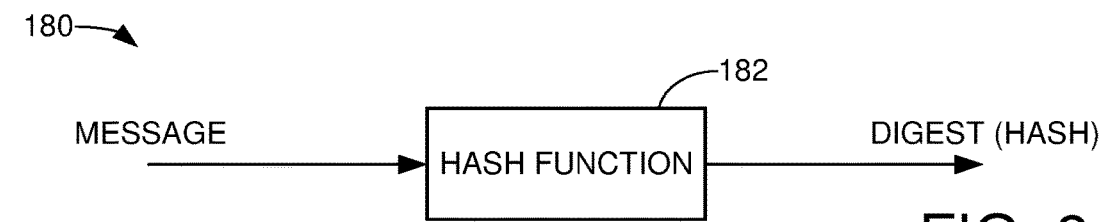
FIG. 8 illustrates a hash block that may be utilized by the trust manager of FIG. 6.
Figure 9:
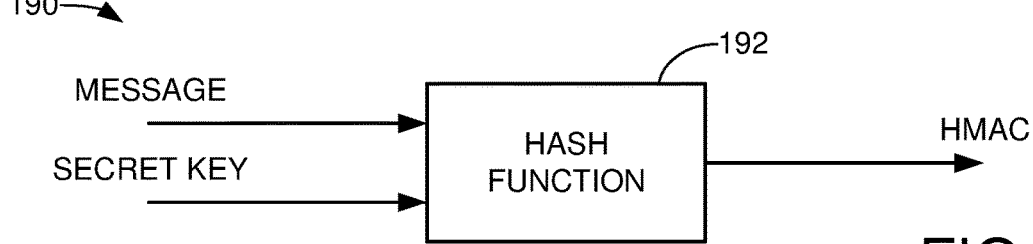
FIG. 9 shows another hash block that can be used by the trust manager of FIG. 6.

FIGS. 7-9 are supplied to briefly describe various types of cryptographic functions that can be carried out in accordance with various embodiments to establish trust and perform security operations within the system. These are merely exemplary as any number of different types and styles of cryptographic algorithms can be readily adapted for use in accordance with the present discussion.

FIG. 7 is a functional block representation of an encryption system 170 useful in accordance with some embodiments. The encryption system includes one or more encryption blocks 172, each of which applies an encryption algorithm to input data, referred to as plaintext, to transform the input data into output data, referred to as ciphertext. One or more encryption keys are supplied as part of the encoding process. Depending on the form of the algorithm, other control inputs can be supplied as well such as seed values, counter values, etc. It will be appreciated that multiple stages of encryption can be applied to a given set of data, so that the plaintext in FIG. 7 can be encrypted ciphertext from an upstream process.

Encryption algorithms such as used by block 172 essentially provide an encoding function so as to transform the input plaintext to an encoded form. In this way, information can be transmitted safely and the underlying contents cannot be easily discovered without the use of massive amounts of computational power unless knowledge of the key(s) is provided. Many forms of encryption are known in the art, including but not limited to symmetric key and public-private key encryption systems. Encryption systems are often implemented in software using programming stored in a local memory executed by a programmable processor, but other encryption circuit configurations can be used as well including gate logic, ASICs, FPGAs, etc.

FIG. 8 is a functional block representation of a hashing system 180 useful in further embodiments. The system 180 includes at least one hash function block 182, which applies a selected hash function to an input data string (referred to as a "message"). As desired, additional inputs can be supplied as well, such as so-called "nonce" values (not shown). Nonce values are often random number strings, although such are not necessarily required.

A hash function is a mathematical algorithm that maps the input data of arbitrary size (e.g., the "message") to an output value of fixed size ("hash," "message digest," etc.). Hash functions are one-way functions so that it is practically infeasible to invert a hash output to recover the original message based on the output hash value. A number of hash functions are commonly employed in modern cryptographic systems, such as the so-called class of SHA (secure hash algorithm) functions including SHA-1, SHA-256, etc.

Because hash functions tend to be deterministic, are collision-resistant and can be easily calculated, hash values can be supplied along with a message to provide evidence that the data have not been tampered with since the time of transmission. This can be verified by recalculating a new hash value based on the received message and comparing the new hash value to the original hash value. Other cryptographic uses for hash values are well known in the art.

FIG. 9 shows another hashing system 190 similar to the system 180 in FIG. 8. The system 190 generates an output referred to as a hash-based message authentication code, or HMAC. The HMAC output value is the result of a hash function upon an input message and a secret encryption (hash) key. In this way, the message can be forwarded along with an HMAC value to a recipient, and the recipient can calculate a new HMAC value based on the message and the secret key. If the respective HMAC values match, it can be determined that the source of the message is an authorized party with access to the secret key, and that the received message is bit-for-bit identical to the original message for which the initial HMAC value was calculated.

Many data security schemes apply multiple levels of processing to transmitted data; for example, a set of plaintext may be encrypted in accordance with FIG. 7, and this encrypted data may be transferred as an encrypted message along with one or more hash values. Processing at the receiving end may include decryption of the encrypted data as well as recalculation of various hash values to ensure, with a high trust level, that the received data correspond to the data initially forwarded by the source node. Other mechanisms can be employed as well, such as digital signatures, encryption using public-private key pairs, etc.

Figure 10:
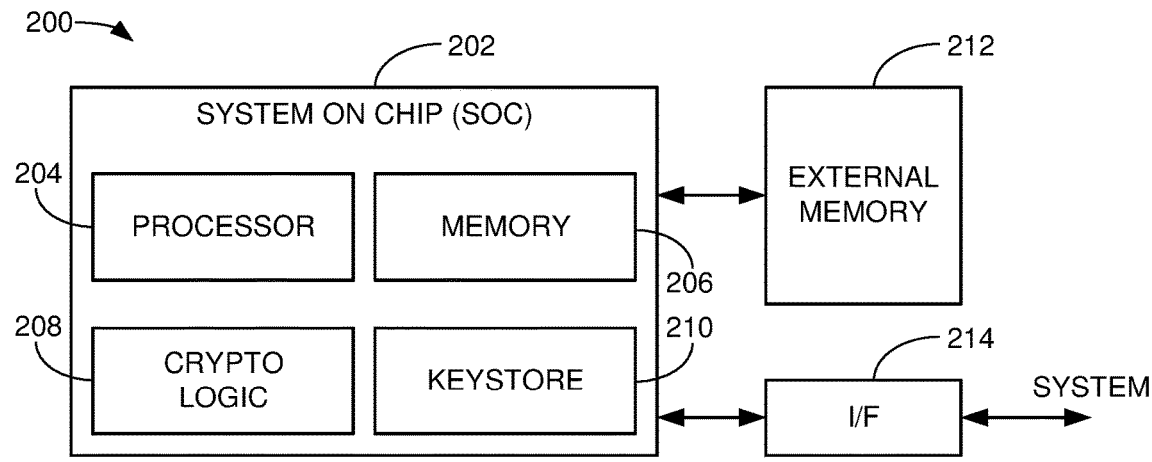
FIG. 10 illustrates a system on chip (SOC) configuration that can be used in a data storage device of the system in accordance with some embodiments.

FIG. 10 shows a functional block representation of a trusted storage node 200 in accordance with further embodiments. The storage node 200 includes a system on chip (SOC) device 202 that corresponds to an integrated circuit package with limited external pins to allow access thereto. The SOC 202 includes a programmable processor 204, a local embedded memory 206, an embedded cryptologic circuit 208 and an embedded keystore 210.

Generally, as noted above the processor 204 is a programmable processor configured to execute program instructions provided from a local memory, such as the local embedded memory 206. The cryptologic circuit 208 performs a number of different cryptographic based functions, including but not limited to those crypto functions described above in FIGS. 7-9, to protect data coming into and exiting the SOC 202 as well as to establish provisional or permanent trust levels for the node 200.

The keystore 210 is an embedded hidden memory, whether previously programmable (e.g., ROM, or read-only-memory), write-once memory (such as in the form of OTM or one time programmable memory elements), rewriteable memory, and so on that is used to store hidden data including but not limited to encryption keys and other cryptographic information. The keystore 210 allows cryptographic information, such as embedded encryption keys, secret information, etc., to be stored internally within the SOC 210 and processed by internal circuitry such as the cryptologic circuit 208 without providing the ability of an attacking party from accessing signal paths that may access or influence the cryptographic operations being carried out to enhance entropy and trust in accordance with the present discussion.

The SOC 202 can operate in accordance with external memory 212 to temporarily transfer and store data. The external memory 212 can take any number of desired forms including DRAM, flash, etc. An interface (I/F) circuit 214 enables the S(I)C 202 to communicate with external nodes within the system. These and other mechanisms can be used to enhance trust of a given node.

Figure 11:
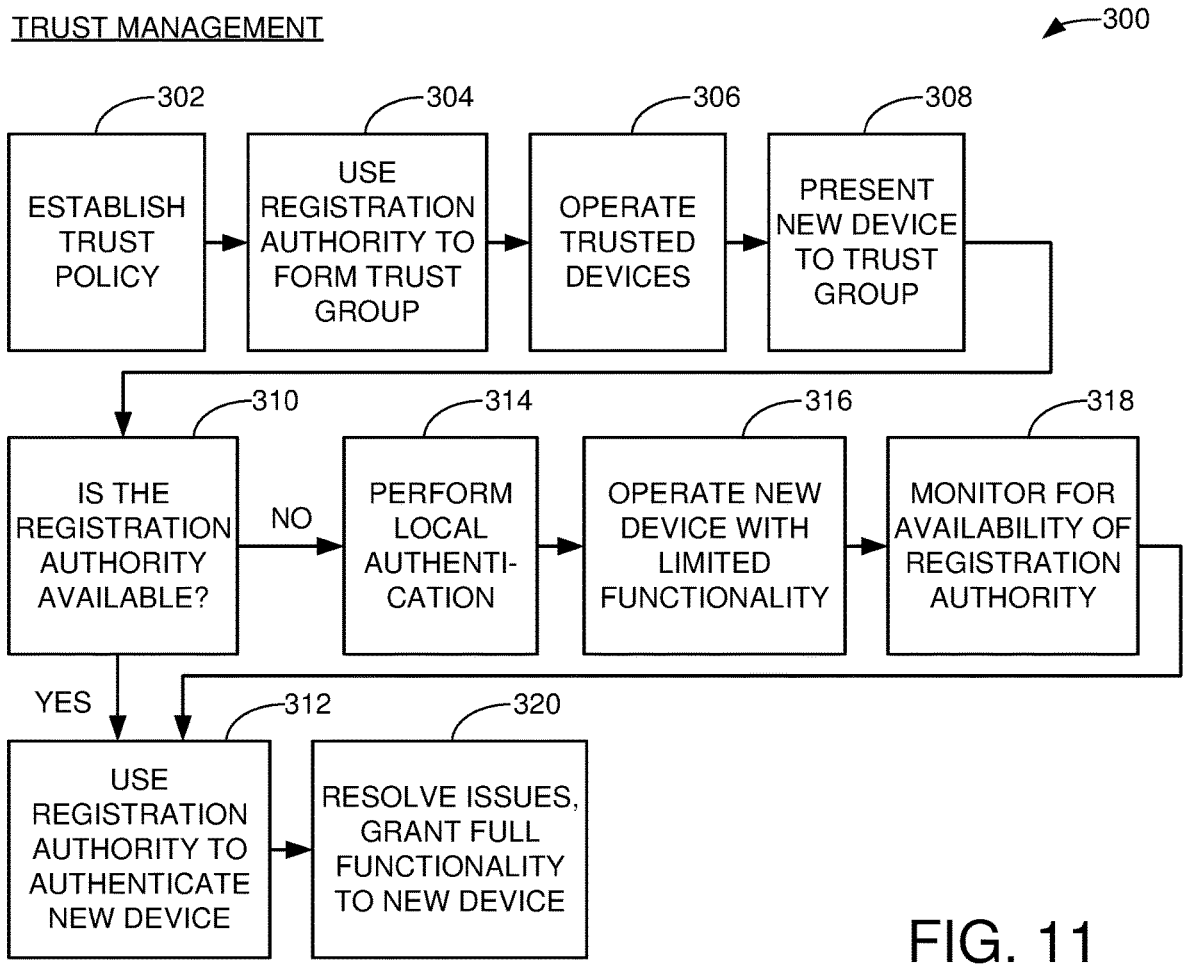
FIG. 11 is a trust management sequence illustrative of steps carried out in accordance with some embodiments.

FIG. 11 provides a functional block representation of a data sequence 300 to represent steps that can be carried out in accordance with the foregoing discussion. It will be understood that these steps are merely illustrative and are not limiting. The flow of FIG. 11 is managed by the trust manager 152 of FIG. 6.

At block 302, a trust policy is established. This trust policy can take a number of forms and may be implemented, for example, by a policy circuit such as module 158 in FIG. 6. The authentication of specific nodes within a given trust group, in accordance with the trust policy, is carried out at block 304.

In some cases, the trust policy can require every node within a selected trust boundary to be subjected to a minimum level of trust verification, either via a centralized or local trust registration authority. The trust policy can assign selected levels of trust to individual nodes, and can further track these trust levels as paths are taken through the system. The trust policy can require that nodes passing a given data packet have a minimum level of trust, even if such nodes are within an established trust boundary.

The trust policy can require different levels of entropy sources (e.g., operating system, OS; hardware levels; firmware levels; etc.) to be used to generate entropy as part of the verification process. The trust policy can further implement certain encryption and/or hash verification algorithms to be used during authentication and data transfers.

Still further, the trust policy can require that trust be repetitively authenticated on a periodic basis to ensure that the trust group maintains the required level of trust over time. Other trust policies can be enacted based on the requirements of a given operational environment.

Regardless of the contours of the enacted trust policy, a trusted group of devices is established within a selected trust boundary at block 304 in accordance with the trust policy of block 302 and a selected registration authority. The trusted group of devices operate at block 306 to perform various functions, including but not limited to the transfer of data sets between source nodes and destination nodes as described above in FIG. 3.

Block 308 shows the subsequent presentation of a new device to the existing trust group. Block 310 determines whether the registration authority used to authenticate the trust group in block 304 is currently available. If so, the flow passes to block 312 where the registration authority is used to authenticate the new device.

However, if the registration authority is off-line or otherwise not currently available, the flow passes from block 310 to block 314 where a local authentication is carried out using a local (second) registration authority. Alternatives are discussed below, but at this point it will be appreciated that the local authentication results in a lower level of trust being imparted to the new device and provisional acceptance of the new device into the trust group. As such, the new device is allowed to operate within the group but on a limited functionality basis, as indicated by block 316.

During continued operation of the provisionally authenticated device, the system (such as via the trust manager 152) continuously monitors for the subsequent availability of the top-level registration authority. This can be the same specific mechanism used to authenticate the trust group, or can be another authority having similar characteristics and authorization levels. When such become available, the flow passes back to block 312 where the new device is fully authenticated. Once the new device becomes a fully trusted member of the trust group, additional steps are carried out at block 320 including verifications of data stored or otherwise processed by the new device during the probationary period.

While the foregoing processing of FIG. 11 will be understood to provide a useful mechanism for providing provisional authentication of new devices, it will occur to the skilled artisan that the specifics involved in providing even a preliminary level of trust to a newly presented, intrusted device raises a number of issues. Generally speaking, the problem presented is the difficulty in assessing the trustworthiness of a new device without the availability of the full range of trust authentication mechanisms. The trustworthiness mechanism needs to be sufficiently rigorous to protect against spoofing and other forms of attacks, including backdoor style attacks that penetrate a system's defenses, while at the same time are sufficiently useful to permit otherwise valid devices to join the network even in a limited role.

To this end, FIG. 12 shows a data processing system 330 constructed and operated in accordance with the foregoing discussion. The system includes a new device 332, an existing device 334, a top-level registration authority 336, a provisional registration authority 338, and a trust manager 340. The trust manager 340 may maintain an internal data log 342 as a data structure to manage trust operations, including operations carried out to authenticate and monitor provisionally added members of the group.

These respective elements are incorporated into a suitable network for operation as described above. A number of forms can be used. In some embodiments, the new device 332 and the existing device 334 may be nodes (or portions thereof) in a trust boundary. The top-level registration authority 336 can be a remote (or local) security server. The provisional registration authority 338 can be any number of devices including but not limited to a server, a computer, a hand-held network accessible device (e.g., a tablet, a smart phone, a laptop, etc.). In some cases, a mobile application (app) may be generated and downloaded to the provisional registration authority device, so that the provisional authentication can be mediated by the local device until such time that normal network communications can be established with the top-level authority device.

The provisional addition of the new device 332 to an existing trust group that includes the existing device 334 involves operation of the provisional registration authority 338 as mediated by the trust manager 340. This preliminary authentication of the new device 332 relies upon certain types of secret information (info) 350 stored by the new device. The secret information can be stored in any number of ways, including (with reference again to FIG. 10) the internal SOC memory 206, the internal SOC keystore 210, the external memory 212., etc.

As shown in FIG. 13, the secret information 350 can take any number of forms as required. In some cases, the secret information can include manufacturing data supplied by a manufacturer of the new device, as indicated by field 352. This can include commonly supplied secret information applied to each of a class of device, such as a particular style and type of device (e.g., model number, capacity, specifications, etc.). The manufacturing data at 352 can additionally or alternately include unique data associated with the manufacture of the device, such as a unique serial number, WWID (global address), etc. assigned to the individual device.

Internal parameters such as represented at 354 can also be included as part of the secret information 350. For example, these data can include internal parameters or other control values noted during device manufacturing and/or certification. As before, the internal parameters may be unique to each device.

Locally loaded data are generally represented at 356. These can include data uploaded to the new device 332 when initially installed at the end user environment, such as during an initialization process. It will be appreciated that this type of processing can be carried out initially when devices are first installed or otherwise connected to the network, even if such devices are not fully integrated (e.g., such as in the case of spare devices, standby devices, etc.).

Secret share data are represented at 358. Secret sharing mechanisms are a form of cryptographic processing well understood in the art, and basically comprise dividing sets of data up into smaller portions. The portions are arranged such that no one portion is sufficient to reveal an overall secret, but sufficient redundancy is built into the system such that, if a large enough number of the portions can be recovered, the secret can be obtained. Hence, in some embodiments various devices may be supplied with secret shares that can be retrieved and used as part of the preliminary authentication process.

Global encryption keys are denoted at 360 and these can cover various keys that are distributed among a number of different devices using trusted mechanisms, such as the top-level registration authority 336. Individual (local) keys can be similarly provided at 360. These keys can further provide at least a first level authentication capability since, at least presumably, a valid device would not otherwise have access to such keys without coming from an authorized source. Finally, summation data are represented at 364. These can be as simple as check sums or other values that, when summed with other values, can provide some level of authentication. The summation data can be similar to, or different from, the secret share data at 358.

Generally, as noted above, the trust manager 340 is presented with using some or all of the secret information 350 in order to, via the provisional registration authority 338, make a determination that the new device can be sufficiently trusted to be added to the trust group as a provisional member. It is contemplated that the provisional authentication sequence will include one or more data exchanges between the new device 332 and other elements of the system, including one or more of the existing devices 334, the provisional registration authority 338 and/or the trust manager 340 itself, in order to determine that preliminary access rights can be granted. These various exchanges can be cryptographically protected using the various encryption and hash functions described above.

Once the trust manager 340 provisionally accepts the new device 332, the trust manager 340 may grant a reduced functionality set to the new device 332. In some cases, the new device may be allowed to participate in certain types of operations such as inter-nodal data transfer operations and local data storage/retrieval operations, but may not be permitted to accept or perform other types of higher level operations. For example, the new device 332 may not be invited to participate in the generation of new keys, the regeneration of data sets in a RAID environment, the trimming of data sets, the deletion or modification to namespaces, and so on. It is contemplated that in further cases, all data written to the new device will be required to be retained by that device, including data logs maintained by the new device 332 (and/or by the trust manager 340) that list all operations carried out by the new device.

To further enhance system security, it may be arranged such that all data stored by the new device in the local NVM thereof (see e.g., FIG. 1) be separately encrypted by an upstream device. To this end, FIG. 14 provides a flow sequence 370 in which upstream plaintext, block 372, is processed for encryption by an upstream trust group encryption process, block 374. This can include encryption applied by a separate device, including the existing device 334 in FIG. 12. Other sources of encryption can be supplied, however, such as by the trust manager 340 (see e.g., FIG. 6).

In this way, only externally encrypted data sets are supplied to the new device 332, which applies a separate, local encryption process to the data as indicated by block 376, prior to the double-encrypted data being stored to the local NVM of the new device, block 378. This additional level of encryption can add some additional overhead processing to the group, since encryption/decryption operations will be generally required for each transfer involving the new device. However, this reduces the opportunity for an attacking party to access or otherwise remove the new device and attempt to obtain the data stored by the new device. It is contemplated that whatever penalties in performance arise, the system will still perform at a higher performance level as compared to not having the new device be available even if in a limited fashion.

Other security operations can be carried out as well, such as an adjustment to the security policy so that all data written to the new device are replicated elsewhere in the system, even if this includes replication to a remote node. In this way, any reliance upon the new device that is found to be unwarranted can be addressed by recovering the data elsewhere.

As with all data security schemes, attack vectors may continually exist for all nodes, including trusted nodes and untrusted/provisionally trusted nodes. As such, during such times that a provisionally accepted device is part of the group, additional steps may be taken to monitor all operations, including those involving the existing trust group. Nevertheless, the system of FIG. 12 provides a mechanism that allows maximum security to be presented to the extent achievable, while limiting opportunities for the provisional device to adversely affect system performance.

It will be appreciated that some types of data may be subjected to a first level of trust policy through the network while other types of data may be subjected to a different, second level of trust policy. Regardless, it is contemplated that the actual trust levels of the various nodes involved in any particular transfer will be recorded, allowing the system to take appropriate follow-on actions as required once the data are received at the end user node. It is possible that a given node may have multiple trust "scores" based on different operations involved in verifying that particular node. Stated another way, a particular node may be able to provide data services (e.g., the receipt, processing and/or passage of data sets) with different trust levels depending on different internal configurations.

It follows that, with reference again to FIG. 3, a selected node (such as Node 8) may be a provisionally accepted device within the trust boundary (e.g., Node 8 can be viewed as the new device 332 in FIG. 12, or as a larger node that includes the new device 332). In this case, certain data transfers may be scheduled so as to avoid this node, whereas other data transfers that involve this node may result in additional notification data being supplied to the end user (e.g., 124, FIG. 3) to allow the end user to take additional verification steps, as required, based on the preliminary status of the node.

Figure 15:
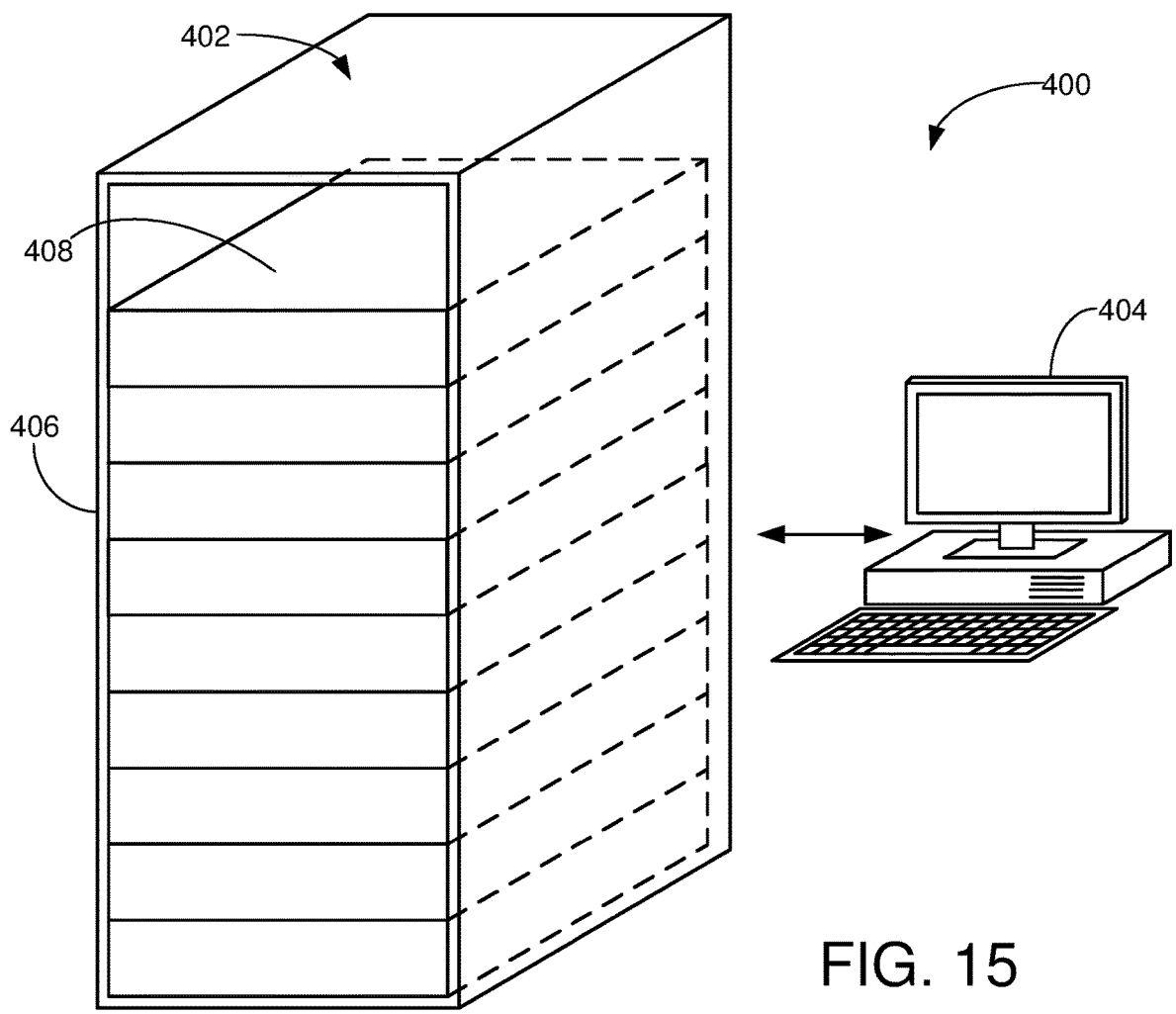
FIG. 15 is a functional block representation of a storage node configured and operated in accordance with some embodiments.

FIG. 15 is a schematic depiction of a data storage system 400 in which various embodiments of the present disclosure may be advantageously practiced. It will be appreciated that the system 400 can correspond to each of the various types of nodes described above. The data storage system 400 is a mass-data storage system in which a large population of data storage devices such as 104 (FIG. 1) are incorporated into a larger data storage space to provide a storage node as part of a larger geographically distributed network. Examples include a cloud computing environment, a network attached storage (NAS) application, a RAID (redundant array of independent discs) a storage server, a data cluster, an HPC environment, a high performance computing (HPC) system, etc.

The system 400 includes a storage assembly 402 and a computer 404 (e.g., server controller, etc.). The storage assembly 402 may include one or more server cabinets (racks) 406 with a plurality of modular storage enclosures 408. While not limiting, the storage rack 406 is a 42U server cabinet with 42 units (U) of storage, with each unit extending about 1.75 inches (in) of height. The width and length dimensions of the cabinet can vary but common values may be on the order of about 24 in.×36 in. Each storage enclosure 408 can have a height that is a multiple of the storage units, such as 2U (3.5 in.), 3U (5.25 in.), etc. to accommodate a desired number of adjacent storage devices 134. While shown as a separate module, the computer 404 can also be incorporated into the rack 406.

Figure 16:
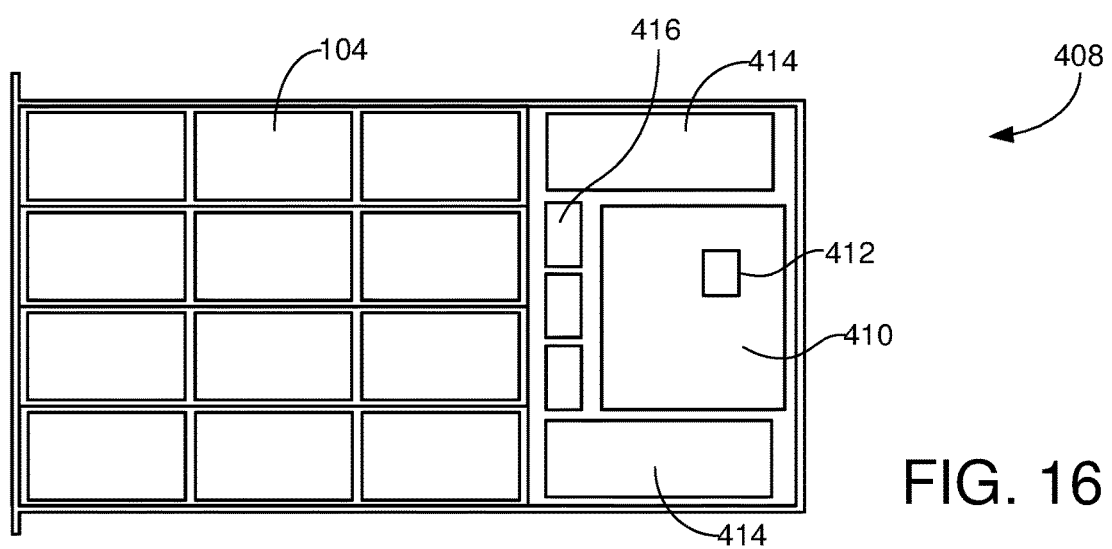
FIG. 16 is a storage enclosure of FIG. 15.

FIG. 16 is a top plan view of a selected storage enclosure 408 that incorporates 36 (3×4×3) data storage devices 104. Other numbers and arrangements of data storage devices can be incorporated into each enclosure, including different types of devices (e.g., HDDs, SDDs, etc.). The storage enclosure 408 includes a number of active elements to support the operation of the various storage devices, such as a controller circuit board 410 with one or more processors 412, power supplies 414 and cooling fans 416.

The modular nature of the various storage enclosures 408 permits removal and installation of each storage enclosure into the storage rack 406 including under conditions where the storage devices 104 in the remaining storage enclosures within the rack are maintained in an operational condition. In some cases, the storage enclosures 408 may be configured with access panels or other features along the outwardly facing surfaces to permit individual storage devices, or groups of devices, to be removed and replaced. Sliding trays, removable carriers and other mechanisms can be utilized to allow authorized agents to access the interior of the storage enclosures as required.

Figure 17:
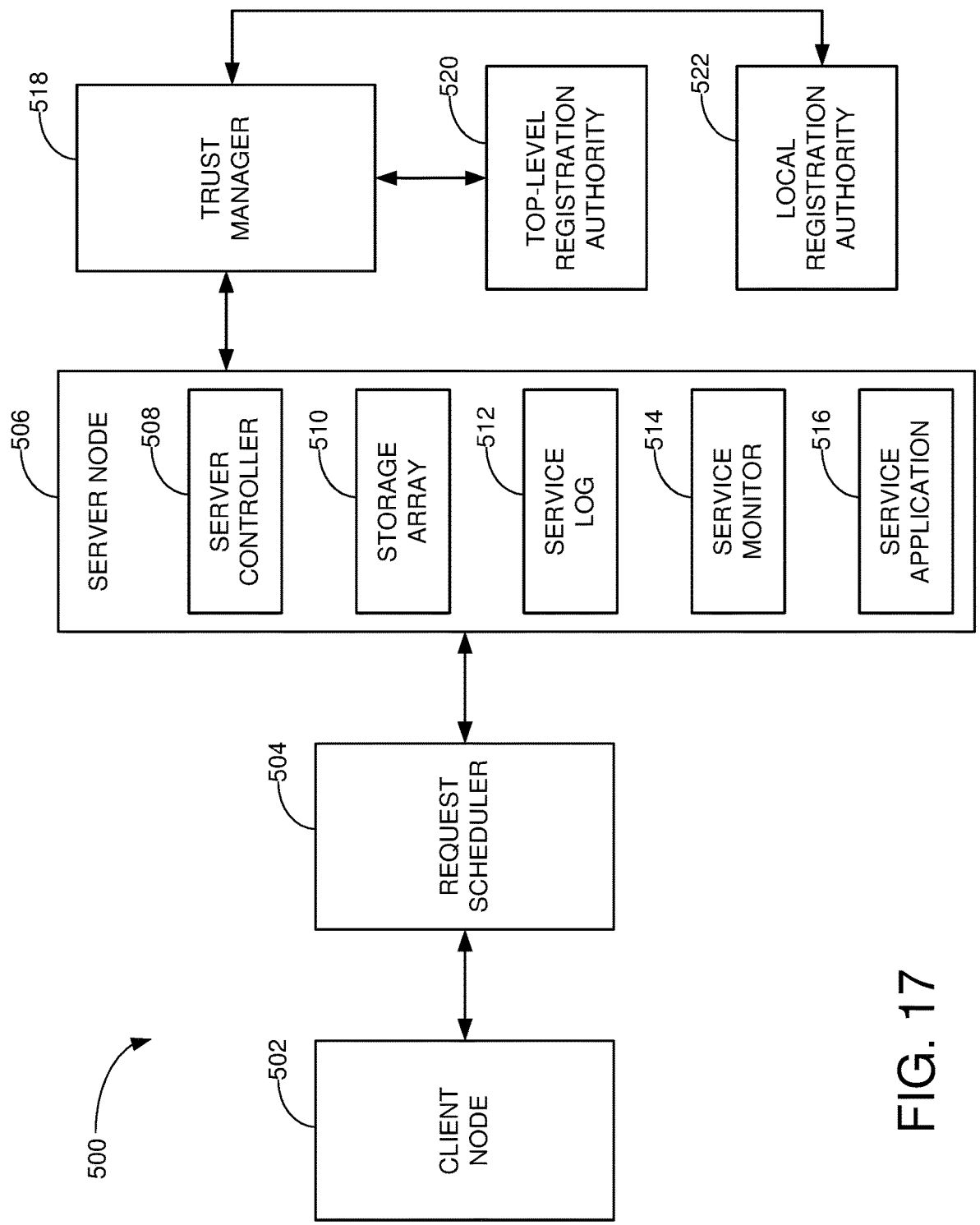
FIG. 17 is another functional block representation of some embodiments.

FIG. 17 provides another functional diagram for a data processing system 500 constructed and operated in accordance with various embodiments. The system 500 in FIG. 17 can be readily incorporated into the various systems and networks discussed above.

The system 500 includes a client node 502, which as described above can operate as a user device to initiate a request to carry out an application or other operation in a distributed storage environment of which the system 500 forms a part. The request is forwarded to a request scheduler 502, which operates to manage the request, as well as additional requests, supplied to the system.

A server node 506 represents an application aspect of the overall distributed storage environment, and can include various elements including a server controller 508, a storage array 510, a service log 512, a service monitor 514, and a service application 516. These respective elements can operate as described above to perform operations responsive to the various requests issued to the system as well as to accumulate and process performance metrics associated therewith.

The service application 516 can represent data and programming instructions stored in the storage array 510, or elsewhere, that are operated upon as a result of a service request issued by the client node 502 and forwarded to the server node 506 by the request scheduler 504.

FIG. 18 further shows a trust manager 518 which operates as described above to establish and monitor trust levels for the server node 506 as well as for other aspects of the system. To this end, the trust manager 518 can access a top-level registration authority 520 to provide main trust level operations, and a local registration authority 522 that can provide provisional trust level operations.

It follows that the various mechanisms within the system are well adapted to establish and monitor trust levels for various nodes involved in data transfer operations within a trust boundary. The trust manager can provide both preliminary and full trust verification capabilities, can monitor ongoing performance, and adjust trust policy requirements to enhance performance. Corrective actions can be taken as required to ensure that all transferred data sets meet the requirements of a given specification.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A method comprising:
   establishing a trust group as a plurality of processing devices that have been authenticated by a first registration authority and which are disposed within a trust boundary of a computer network;
   adding a new processing device to the trust group at a time when access to the first registration authority is unavailable by using a local, second registration authority to provide provisional authentication to the new processing device;
   operating the new processing device as a provisional member of the trust group while restricting a full range of operability thereof available to the remaining processing devices in the group; and
   subsequently authenticating the new processing device using the first authentication authority and removing the restricting of the full range of operability thereof.

2. The method of claim 1, wherein the provisional authentication of the new processing device using the second registration authority comprises a transfer of secret information stored by the new processing device to the second registration authority.

3. The method of claim 2, wherein the secret information comprises data stored to the new processing device during manufacturing thereof.

4. The method of claim 2, wherein the secret information comprises data stored to the new processing device during installation thereof into the computer network.

5. The method of claim 1, wherein the first registration authority is characterized as a centralized trusted security interface (TSI) server, and wherein the plurality of processing devices in the trust group are each separately authenticated via security data transfers across the computer network between the processing devices and the centralized TSI server.

6. The method of claim 1, wherein the first registration authority is characterized as a decentralized peer-level arrangement, and wherein the plurality of processing devices in the trust group are each separately authenticated via security data transfers across the computer network between the respective processing devices without communication with a remote TSI server.

7. The method of claim 6, wherein the decentralized peer-level arrangement further comprises a local hub server which communicates with each of the plurality of processing devices during the separate authentication thereof.

8. The method of claim 1, wherein each of the plurality of processing devices comprises a data storage device comprising a data storage device controller and a non-volatile memory (NVM).

9. The method of claim 1, wherein during the operating step a first set of functions are available to each of the plurality of processing devices in the trust group, and wherein a reduced, second set of functions are made available to the new processing device so that at least one function in the first set is not available in the second set and cannot be carried out by the new processing device.

10. The method of claim 1, wherein a data set to be stored to a memory of the new processing device is encrypted, by a selected one of the plurality of processing devices using a first cryptographic operation prior to being transferred to the new processing device, and wherein a controller of the new processing device subsequently encrypts, using a different, second cryptographic operation, the data set prior to storing the data set to the memory of the new processing device.

11. The method of claim 1, wherein a trust manager circuit manages the authentication of the plurality of processing devices in the trust group using the first registration authority, manages the preliminary authentication of the new processing device using the second registration authority responsive to a determination that the first registration authority is off-line, and manages a follow-up authentication of the new processing device using the first registration authority responsive to a subsequent determination that the first registration authority is on-line.

12. The method of claim 1, wherein each of the first and second registration authorities comprise security servers accessible via the computer network, each of the security servers comprising at least one programmable processor and associated programming stored in a memory executed by the programmable processor to carry out trust verification operations upon the respective plurality of processing devices and the new processing device.

13. The method of claim 1, wherein each of the plurality of processing devices and the new processing device comprise a data storage device comprising a controller having at least one programmable processor and a non-volatile memory (NVM) to provide a main store for user data.

14. The method of claim 1, further comprising providing, to an end user node which receives a request from a sender node through the trust group, a corresponding notification that the request passed through the new processing device while the new processing device operated as a provisional member of the trust group.

15. An apparatus comprising:
a plurality of processing devices interconnected via a computer network;
a trust manager circuit configured to:
fully authenticate each of the plurality of processing devices to form a trust group within a trust boundary using a first registration authority, each of the processing devices having at least a minimum level of trust;
partially authenticate a new processing device as a provisional member of the trust group using a different, second registration authority responsive to unavailability of the first registration authority, the new processing device having less than the minimum level of trust;
provisionally operate the new processing device to transfer data between the new processing device and the plurality of processing devices;
determine subsequent availability of the first registration authority; and
use the first registration authority to fully authenticate the new processing device.

16. The apparatus of claim 15, wherein each of the fully authenticated plurality of processing devices has a set of available functions that can be carried out thereby responsive to client requests, and wherein the trust manager circuit disables the partially authenticated new processing device from performing at least one command from the set of available functions.

17. The apparatus of claim 15, wherein the trust manager circuit uses secret information associated with the new processing device to perform the partial authentication of the new processing device via the second registration authority, the secret information comprising at least a selected one of manufacturing data, internal parameters, locally loaded data, secret share data, encryption keys, or summation data, the secret information stored in an internal memory of the new processing device.

18. The apparatus of claim 15, wherein each of the plurality of processing devices and the new processing device comprises a server node comprising at least one data storage device having a non-volatile memory (NVM) to provide a main store for use data.

19. The apparatus of claim 15, wherein the trust manager circuit generates a data log that stores, in a data structure in a memory, a listing of all data transfers carried out by the new processing device while the new processing device remains in the provisionally authenticated state.

20. The apparatus of claim 19, wherein the trust manager circuit further operates to verify, after the new processing device has been transitioned to the fully authenticated state, all data sets previously stored in a non-volatile memory (NVM) of the new processing device while the new processing device operated in the provisionally authenticated state.

* * * * *